(12) United States Patent
Colten et al.

(10) Patent No.: US 7,716,980 B1
(45) Date of Patent: May 18, 2010

(54) PITOT PROBE WITH WATER BLOCKAGE PREVENTION

(75) Inventors: Todd M. Colten, St. Paul, MN (US);
Wade W. Brown, Blaine, MN (US);
Ryan L. Nelson, Farmington, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 30 days.

(21) Appl. No.: 12/130,222

(22) Filed: May 30, 2008

(51) Int. Cl.
*G01P 13/00* (2006.01)
(52) U.S. Cl. .................................. 73/170.02
(58) Field of Classification Search .................. 73/700, 73/714
See application file for complete search history.

(56) References Cited

U.S. PATENT DOCUMENTS

| | | | |
|---|---|---|---|
| 4,645,517 A * | 2/1987 | Hagen et al. ................. | 73/182 |
| 6,892,584 B2 * | 5/2005 | Gilkison et al. ............... | 73/736 |
| 7,490,510 B2 * | 2/2009 | Agami et al. ............ | 73/170.02 |
| 7,549,331 B1 * | 6/2009 | Powell ................. | 73/170.02 |
| 2003/0010130 A1 * | 1/2003 | Bachinski ................. | 73/747 |
| 2007/0107510 A1 * | 5/2007 | Agami et al. ................ | 73/182 |

* cited by examiner

*Primary Examiner*—Andre J Allen
(74) *Attorney, Agent, or Firm*—Hamre, Schumann, Mueller & Larson, P.C.

(57) ABSTRACT

Pitot probes are described that are designed to prevent water blockage of the probe's air pressure orifice. The pitot probes are small, inexpensive, light weight and do not require power for heat generation. This makes the pitot probes particularly useful for use on UAV's and other small aircraft where size, cost, weight and power constraints are a major concern. The pitot probes utilize passive methods in the form of geometrical and material configurations to prevent blockage of the pitot probes by water droplets. The probes can also include water reservoirs that store collected water.

15 Claims, 1 Drawing Sheet

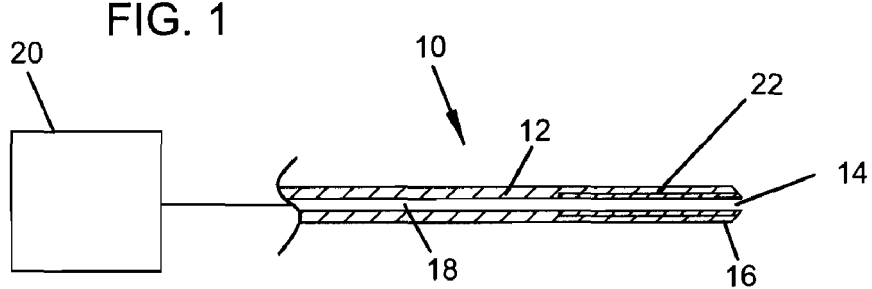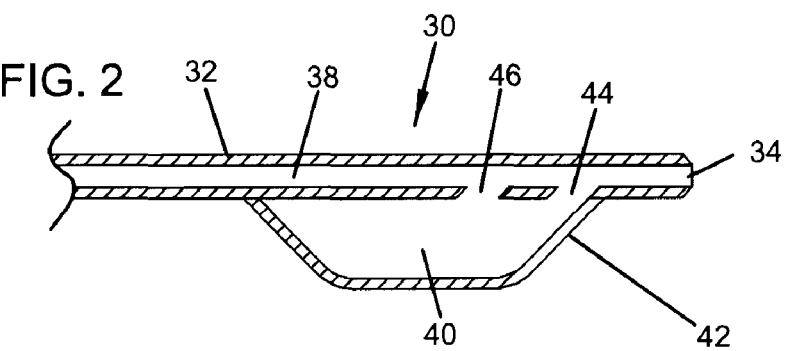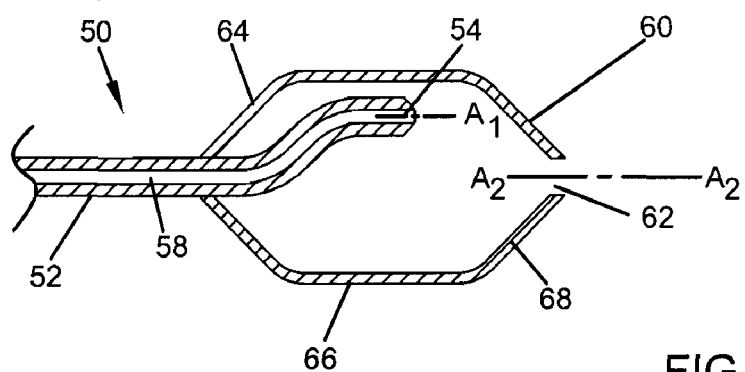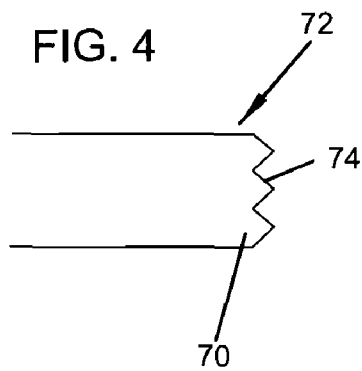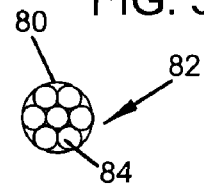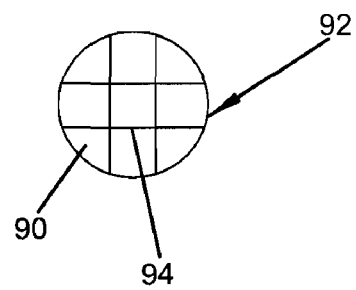

PITOT PROBE WITH WATER BLOCKAGE PREVENTION

FIELD

This disclosure relates to pitot probes, in particular pitot probes that are useful on aircraft that fly in rain, sleet or snow.

BACKGROUND

Pitot probes are commonly used on aircraft and other applications for measuring airspeed. In certain weather conditions, a water droplet(s) can plug up the air pressure orifice at the front of the pitot probe, causing the pitot probe to incorrectly read the airspeed. In the past, this problem has been solved by using a heated pitot probe which uses heat to vaporize the water droplet(s). The heat is either generated electrically, or by diverting heat from the aircraft's engine(s). Other ways this problem has been solved is by using a specially calibrated pitot probe with a drain hole to remove water droplet(s) from the probe while installed, or by creating a pitot probe with a large diameter to prevent water droplet(s) from plugging up the probe.

Many small aircraft, including unmanned aerial vehicles (UAV's), typically cannot afford to carry the weight and size of previous pitot probes such as the probes listed above, and may not have sufficient energy resources to spare energy for use by a heated probe.

SUMMARY

Improved pitot probes are described that prevent water blockage of the pitot probe air pressure orifice. The pitot probes are small, inexpensive, light weight and do not require power for heat generation. This makes the pitot probes particularly useful for use on UAV's and other small aircraft where size, cost, weight and power constraints are a major concern. However, these pitot probes could also be used on aircraft that have previously used traditional pitot probes.

The pitot probes utilize passive methods in the form of geometrical and/or material configurations to prevent blockage of the pitot probes by water droplets. The geometrical configurations include the geometry of the internal air pressure passage of the probe body and/or the geometry of the inlet orifice of the probe.

In one embodiment, a pitot probe includes a probe body having an inlet air pressure sensing orifice at an inlet end thereof and an internal air pressure passage extending from the orifice through the probe body. The probe also includes a water reservoir. There is no water exit port connected to the water reservoir so that water collected in the water reservoir does not drain from the water reservoir. Instead, water collects in the water reservoir, and if the reservoir becomes full, the pitot probe can be drained or removed and discarded for a new pitot probe.

The water reservoir can have a number of different forms. Examples include, but are not limited to, a hydrophilic material inside the probe body, a chamber connected to the probe body and connected to the internal air pressure passage, and a shroud connected to the probe body and surrounding the orifice.

In another embodiment, a pitot probe includes a probe body having an inlet air pressure sensing orifice at an inlet end thereof and an internal air pressure passage extending from the orifice through the probe body. The orifice has a geometry that is configured to break up water droplets. Examples of suitable geometry include, but are not limited to, the orifice being serrated, the orifice being divided into a plurality of smaller tubes, and a screen in the orifice.

Further, there is no through-flow of air from the internal air pressure passage to an exterior of the probe body. In previous pitot probe designs, a through flow of air is provided which assists in preventing water droplet blockage of the orifice. Therefore, in the designs described herein, alternative means are provided for preventing water droplet blockage.

DRAWINGS

FIG. 1 is a cross-sectional view of a portion of a pitot probe according to one embodiment.

FIG. 2 is a cross-sectional view of a portion of a pitot probe according to another embodiment.

FIG. 3 is a cross-sectional view of a portion of a pitot probe according to another embodiment.

FIG. 4 is a side view of one embodiment of an inlet end of a pitot probe.

FIG. 5 is an end view of another embodiment of an inlet orifice of a pitot probe.

FIG. 6 is an end view of another embodiment of an inlet orifice of a pitot probe.

DETAILED DESCRIPTION

With reference to FIG. 1, a portion of a pitot probe 10 according to one embodiment is illustrated. The probe 10 includes a generally cylindrical probe body 12 having an inlet air pressure sensing orifice 14 at an inlet end 16 thereof. An internal air pressure passage 18 extends from the orifice 14 through the probe body 12 to a rear end of the probe body. The passage 18 leads to an air pressure sensor 20 which senses the air pressure. The air pressure reading is then used to calculate the air speed in a known manner.

In use, the probe 10 is connected to an aircraft, for example a UAV, and projects forwardly from the aircraft so that the orifice 14 faces forwardly toward the oncoming air flow. When the aircraft is flying in rain, sleet or snow, there is a chance that a water droplet will strike the tip of the probe 10 and will plug the orifice 14 through surface tension. If plugged, the probe will not correctly read the air speed.

To prevent plugging of the orifice 14, the probe 10 is provided with means to prevent plugging. In FIG. 1, the means to prevent plugging comprises a hydrophilic material 22 disposed in the internal passage 18. The hydrophilic material 22 is circumferentially disposed within the interior of the probe body around the flow passage 18 and extends from the orifice 14 towards the rear of the passage 18. The hydrophilic material 22 draws water away from the orifice 14 and acts as a water reservoir by collecting and holding the water. The extent of the hydrophilic material 22 along the passage 18 can be chosen based on how much water one anticipates needs to be collected and retained.

As used herein, a hydrophilic material is one that performs the functions of drawing water away from the orifice 14 and collecting and holding water. Any material or combinations of materials that performs these functions can be used and are intended to be encompassed by the term hydrophilic material. The hydrophilic material can be in any suitable form including, but not limited to, fibers, gels, particulates, combinations thereof, and combinations of hydrophilic and non-hydrophilic materials. An example of a suitable hydrophilic material for use in the pitot probe 10 is a superabsorbent polymer (SAP), such as a cross-linked sodium polyacrylate.

Because hydrophilic materials have a tendency to swell when water is absorbed, a retaining means, such as a mesh screen, can be provided at the interior diameter of the hydrophilic material 22 to hold the material in place and prevent inward swelling of the material that could cause a reduction in the diameter of the flow passage 18.

There is no water exit port connected to the hydrophilic material 22 or any special provision for removing the water from the hydrophilic material 22. Therefore, the hydrophilic material 22 can be said to permanently retain the collected water, except for any amounts of water that may evaporate from the material 22 or drain from the material 22 out the orifice 14 when the aircraft is not in use.

If it is determined that the hydrophilic material 22 is saturated, or whenever desired, the pitot probe 10 is replaced with a new probe. As a result, the probe 10 can be characterized as being disposable. The probe body 12 can be made of any materials suitable for forming a pitot probe body, for example metal or plastic. Because the probe 10 is intended to be replaceable, the probe body 12 is preferably made of a material, for example plastic, that is relatively inexpensive.

FIG. 2 illustrates another embodiment of a pitot probe 30. The probe 30 includes a generally cylindrical probe body 32 having an inlet air pressure sensing orifice 34 at an inlet end thereof, and an internal air pressure passage 38 that extends from the orifice 34 through the probe body 32 to a rear end of the probe body. The passage 38 leads to an air pressure sensor (not shown) which senses the air pressure as in the embodiment of FIG. 1.

In FIG. 2, the means to prevent plugging of the orifice 34 comprises an increase in the diameter of the passage 38 behind the orifice 34. In the illustrated embodiment, the increase in diameter is caused by a water reservoir 40 formed by a chamber 42 that is integral with the probe body 32. The chamber 42 can be integrally formed with the probe body 32 or formed separately and then attached to the probe body. Two holes 44, 46 connect the passage 38 to the reservoir 40. It is not necessary for the diameter of the two holes 44, 46 to be bigger or smaller than the orifice 34. However, the two holes 44, 46 must be big enough to prevent water from plugging them up. In some embodiments, the water reservoir 40 may contain a hydrophilic material to pull water through the two holes 44, 46. Also, in some embodiments, only a single hole may be used and in other embodiments three or more holes may be used to connect the passage 38 to the reservoir 40.

In use of the probe 30, the increase in the diameter of the passage 38 allows water droplets to be pulled into the passage 38 away from the orifice 34 through the forces of surface tension and the pressure force in front of the water droplets from the moving air. The water droplets then flow through the holes 44, 46 and into the reservoir 40 which collects water droplets as the droplets are pulled away from the orifice 34. As in the embodiment of FIG. 1, there is no water exit port from the reservoir 40 that would allow water to drain.

FIG. 3 illustrates another embodiment of a pitot probe 50. The probe 50 includes a generally cylindrical probe body 52 having an inlet air pressure sensing orifice 54, and an internal air pressure passage 58 that extends from the orifice 54 through the probe body 52 to a rear end of the probe body. The passage 58 leads to an air pressure sensor (not shown) which senses the air pressure as in the embodiment of FIG. 1. The probe body 52 is curved upwardly at the front end so that the axis $A_1$-$A_1$ of the orifice 54 is displaced from the axis of the rear end of the probe body.

A shroud 60 is connected to the probe body 52 and surrounds the orifice 54. The shroud 60 includes an inlet opening 62 at a leading end thereof with a diameter greater than a diameter of the orifice 54 of the probe body 52. The larger diameter of the opening 62 prevents plugging of the opening 62 by water. The opening 62 can also include a surfactant to reduce the surface tension with water.

In the illustrated embodiment, the shroud 60 includes first conical section 64 that flares outwardly, a constant diameter section 66 extending forwardly from the first conical section 64, and a second conical section 68 connected to the front end of the section 66 and which tapers inwardly to the inlet opening 62. The rear end of the section 64 opposite the inlet opening 62 is connected to the probe body 52. It is to be realized that the shroud can have other geometries as well.

The shape of the shroud 60 is sufficient to form a water reservoir to collect water droplets and other moisture that enters the shroud 60. In the illustrated embodiment, the axis $A_1$-$A_1$ of the orifice 54 is offset from the axis $A_2$-$A_2$ of the inlet opening 62. This helps prevent water droplets, sleet or snow that enters the inlet opening 62 from directly impinging on the orifice 54, thereby preventing plugging. The mass of any moisture particles that enter the inlet 62 will generally prevent those particles from then flowing upward to the orifice 54. Instead, the moisture particles will likely impact on the probe body 52 or on the conical section 64. The moisture particles will then collect at the bottom of the shroud 60. As in the embodiments of FIGS. 1 and 2, there is no water exit port from the shroud 60 that would allow collected water to drain. This also prevents any loss of pressure in the probe 30.

Although the axis $A_1$-$A_1$ of the orifice 54 is described as being offset from the axis $A_2$-$A_2$ of the inlet opening 62, the axes $A_1$-$A_1$ and $A_2$-$A_2$ could be coaxial as long as means are provided to prevent plugging of the orifice 54. For example, the measures described in FIGS. 1 and 2 could be used.

In each of the embodiments of FIGS. 1-3, there is no through-flow of air from the internal air pressure passage to the exterior of the probe body. Therefore, the pitot probes do not need to be calibrated. In some previous pitot probe designs, a through-flow of air is provided which not only aids in preventing moisture plugging of the inlet orifice, but also requires that the pitot probes be calibrated.

The geometry of the leading end of the probe body and/or the geometry of the orifice can also be designed to prevent plugging by liquid droplets.

For example, with reference to FIG. 4, an inlet end 70 of a probe body 72 is illustrated. The inlet end 70 is provided with serrations 74 which help break up liquid droplets when they impinge upon the inlet end 70.

FIG. 5 illustrates another example which is an end view of an inlet orifice 80 of a pitot probe 82 where the orifice 80 is divided by a plurality of small tubes 84. The tubes 84 can extend a short distance into the probe body. Due to surface tension, when a water droplet impinges on the orifice 80, some of the tubes 84, spaces between the tubes, and spaces between the tubes and the interior of the passage will plug up, while typically at least one space will remain open allowing an accurate air pressure reading.

FIG. 6 is another example where an inlet orifice 90 of a pitot probe 92 is provided with a grate-like structure 94. Due to surface tension, the grate-like structure 94 helps break up water droplets that impinge on the orifice 90, thereby preventing plugging of the orifice 90.

The embodiments in FIGS. 4-6 can be used separately or together with one or more of the embodiments in FIGS. 1-3. In addition, the embodiment in FIG. 4 can be used together with the embodiments in FIGS. 5-6.

The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A pitot probe, comprising:
a probe body having an inlet air pressure sensing orifice at an inlet end thereof and an internal air pressure passage extending from the orifice through the probe body; and a water reservoir, there being no water exit port connected to the water reservoir whereby water collected in the water reservoir cannot drain from the water reservoir.

2. The pitot probe of claim 1, wherein the water reservoir comprises a hydrophilic material inside the probe body within the internal air pressure passage, the hydrophilic material extending to the orifice.

3. The pitot probe of claim 1, wherein the water reservoir comprises a chamber connected to the probe body, the chamber being connected to the internal air pressure passage.

4. The pitot probe of claim 1, wherein the water reservoir comprises a shroud connected to the probe body and surrounding the orifice, the shroud having an inlet opening at a leading end thereof with a diameter greater than a diameter of the orifice of the probe body.

5. The pitot probe of claim 4, wherein the inlet opening of the shroud includes a surfactant.

6. The pitot probe of claim 4, wherein the axis of the orifice is offset from the axis of the inlet opening.

7. The pitot probe of claim 1, wherein the orifice has a geometry configured to break up water droplets.

8. The pitot probe of claim 7, wherein the geometry of the orifice comprises serrations, a plurality of tubes, or a screen.

9. A pitot probe, comprising:
a probe body having an inlet air pressure sensing orifice at an inlet end thereof and an internal air pressure passage extending from the orifice through the probe body; the orifice has a geometry configured to break up water droplets; and there is no through-flow of air from the internal air pressure passage to an exterior of the probe body.

10. The pitot probe of claim 9, wherein the geometry of the orifice comprises serrations, a plurality of tubes, or a screen.

11. The pitot probe of claim 9, further comprising a hydrophilic material inside the probe body within the internal air pressure passage, the hydrophilic material extending to the orifice.

12. The pitot probe of claim 9, further comprising a chamber connected to the probe body to the rear of the orifice, the chamber being connected to the internal air pressure passage whereby a diameter of the internal air pressure passage increases to the rear of the orifice.

13. The pitot probe of claim 9, further comprising a shroud connected to the probe body and surrounding the orifice, the shroud having an inlet opening at a leading end thereof with a diameter greater than a diameter of the orifice of the probe body.

14. The pitot probe of claim 13, wherein the inlet opening of the shroud includes a surfactant.

15. The pitot probe of claim 13, wherein the axis of the orifice is offset from the axis of the inlet opening.

* * * * *